United States Patent
Nagulakonda et al.

(10) Patent No.: US 11,042,929 B2
(45) Date of Patent: Jun. 22, 2021

(54) GENERATING INSTRUCTION SETS IMPLEMENTING BUSINESS RULES DESIGNED TO UPDATE BUSINESS OBJECTS OF FINANCIAL APPLICATIONS

(71) Applicant: Oracle Financial Services Software Limited, Mumbai (IN)

(72) Inventors: Gangadhar Nagulakonda, Bangalore (IN); Rajaram Narasimha Vadapandeshwara, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 830 days.

(21) Appl. No.: 14/595,223

(22) Filed: Jan. 13, 2015

(65) Prior Publication Data

US 2016/0071202 A1    Mar. 10, 2016

(30) Foreign Application Priority Data

Sep. 9, 2014 (IN) .......................... 4421/CHE/2014

(51) Int. Cl.
*G06Q 30/00*   (2012.01)
*G06Q 40/00*   (2012.01)
*G06Q 10/06*   (2012.01)

(52) U.S. Cl.
CPC ............ *G06Q 40/00* (2013.01); *G06Q 10/06* (2013.01)

(58) Field of Classification Search
CPC ...................................................... G06F 17/00
USPC ....... 705/35, 1.1, 38, 42, 16, 17, 21, 44, 45; 235/379, 380, 382; 707/792, 778, 793
See application file for complete search history.

(56) References Cited

U.S. PATENT DOCUMENTS

| | | | |
|---|---|---|---|
| 5,502,826 A | 3/1996 | Vassiliadis et al. | |
| 6,826,698 B1 | 11/2004 | Minkin et al. | |
| 7,277,875 B2 * | 10/2007 | Serrano-Morales | G06N 5/022 |
| | | | 706/47 |
| 7,725,416 B2 | 5/2010 | Buss | |
| 7,802,076 B2 | 9/2010 | Almog et al. | |

(Continued)

FOREIGN PATENT DOCUMENTS

| | | |
|---|---|---|
| EP | 0498067 A2 | 8/1992 |
| JP | 2007-052744 A | 3/2007 |

(Continued)

OTHER PUBLICATIONS

ProQuestDialogNPL Search History.*

(Continued)

*Primary Examiner* — John H. Holly
(74) *Attorney, Agent, or Firm* — IPHorizons PLLC; Narendra Reddy Thappeta

(57) ABSTRACT

An aspect of the present disclosure generates instruction sets implementing business rules designed to update business objects of financial applications. In one embodiment, business rules designed to update business objects used by a financial application are processed to form a set of buckets (of rules) such that each bucket contains rules that do not have inter-dependency in execution order. Then, for each bucket, subsets of rules designed to update a common business object are determined, and a corresponding single instruction set is generated for each determined subset of rules. The instruction sets generated for the subsets of rules contained in each bucket are then executed concurrently.

19 Claims, 7 Drawing Sheets

(56) References Cited

U.S. PATENT DOCUMENTS

| | | | |
|---|---|---|---|
| 8,407,258 B2* | 3/2013 | Morinville | G06F 21/604 |
| | | | 707/792 |
| 8,499,279 B2* | 7/2013 | Gupta | G06F 8/24 |
| | | | 717/105 |
| 8,533,545 B2 | 9/2013 | Goyal et al. | |
| 2003/0167460 A1 | 9/2003 | Desai et al. | |
| 2005/0120014 A1* | 6/2005 | Deffler | G06F 16/284 |
| 2008/0065589 A1 | 3/2008 | Birka et al. | |
| 2013/0311754 A1 | 11/2013 | Brown et al. | |
| 2014/0089342 A1 | 3/2014 | Takayanagi et al. | |
| 2014/0101154 A1 | 4/2014 | Nagulakonda et al. | |

FOREIGN PATENT DOCUMENTS

| | | |
|---|---|---|
| JP | 2011-175357 A | 9/2011 |
| WO | WO/2012/160813 A | 11/2012 |

OTHER PUBLICATIONS

The International Search Report, dated Oct. 8, 2015, pp. 1-3, International Bureau.

Written Opinion of the International Searching Authority, pp. 1-6, International Bureau.

Clark N, Hongtao Zhong Mahlke S, Processor Acceleration Through Automated Instruction Set Customization, Microarchitecture, 2003. Micro-36. Proceedings. 36th Annual IEEE/ACM International Symposium on, Date of Conference: Dec. 3-5, 2003 , pp. 129-140, Publisher:IEEE.

ISR Search Report, Co-pending PCT International application No. PCT/IB2015/055820 (filed: Jul. 31, 2015), Oct. 3, 2015, pp. 1-3.

Written Opinion of the International Searching Authority, Co-pending PCT International application No. PCT/IB2015/055820 (filed: Jul. 31, 2015), Oct. 8, 2015, pp. 1-6.

* cited by examiner

GENERATING INSTRUCTION SETS IMPLEMENTING BUSINESS RULES DESIGNED TO UPDATE BUSINESS OBJECTS OF FINANCIAL APPLICATIONS

PRIORITY CLAIM

The instant patent application is related to and claims priority from the co-pending provisional India patent application entitled, "Generating Instruction Sets Implementing Business Rules Designed To Update Business Objects Of Financial Applications", Serial No.: 4421/CHE/2014, Filed: 9 Sep. 2014, which is incorporated in its entirety herewith to the extent not inconsistent with the disclosure herein.

BACKGROUND

Technical Field

The present disclosure relates to financial application servers, and more specifically to generating instruction sets implementing business rules designed to update business objects of financial applications.

Related Art

Financial applications refer to a class of applications which relate to management of financial instruments such as credit cards, loans, bank accounts, etc. Financial applications find use in diverse business enterprises such as banks, insurance company, stock brokerages, etc., as is well known in the relevant arts.

Business objects are often the basis for modelling data/information processed by financial applications. A business object contains various attributes, with an instance ("object instance") of the business object having corresponding values for respective attributes. When stored in a relational database system, a business object may correspond to one or more tables, with each attribute corresponding to a respective column of such table(s). Each object instance may then correspond to a row in such table(s).

Business rules are employed in financial applications to update business objects. Business rules are at a conceptual level, which are understandable to business users (e.g., finance managers, business analysts, senior management, etc.), who may not be conversant with corresponding implementations closer to the level (e.g., programming language, SQL queries, etc.) at which machines are able to operate.

Updating a business object implies a change to corresponding values of one or more attributes of respective object instances of the business object. As a simple case, a bank may have a business rule that updates an interest rate depending on different levels of credit ratings of the customer (high risk, medium risk and low risk) and the type of the loan (e.g., home, car, personal, etc.). As may be readily appreciated, performance of the rule causes a change to multiple object instances. Complex rules typically involve several more variables/dimensions, update to multiple attributes and/or complex computations for the values of the updated attributes.

Business rules are converted to equivalent instruction sets, which are more suitable for execution on machines. For example, assuming that business objects are stored in relational database systems, the instruction sets include SQL (structured query language) queries directed to the tables of the relational database systems.

Aspects of the present disclosure are directed to generating instruction sets implementing business rules designed to update business objects of financial applications.

BRIEF DESCRIPTION OF THE DRAWINGS

Example embodiments of the present disclosure are described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
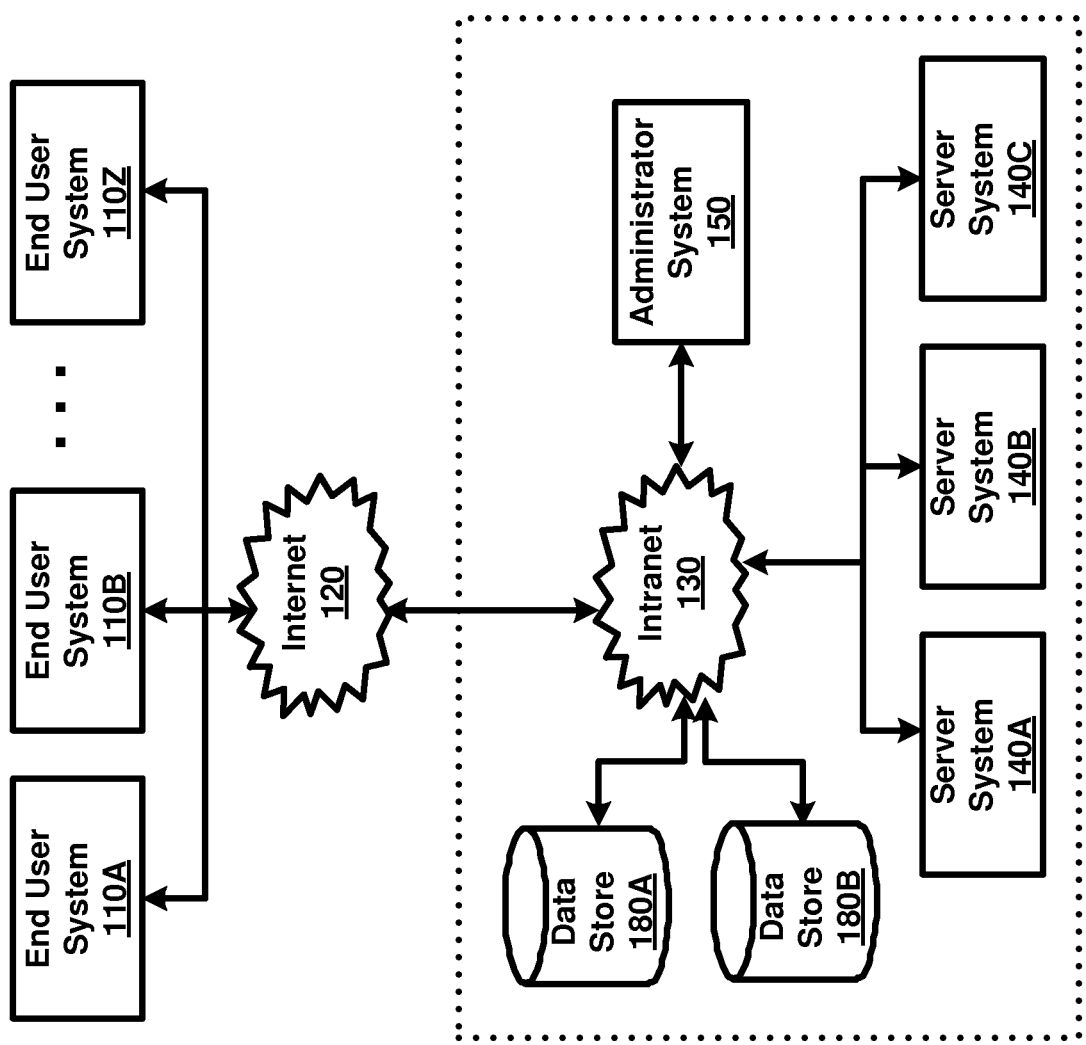
FIG. 1 is a block diagram illustrating an example environment in which several aspects of the present disclosure can be implemented.

An aspect of the present disclosure generates instruction sets implementing business rules designed to update business objects of financial applications. In one embodiment, business rules designed to update business objects used by a financial application are processed to form a set of buckets (of rules) such that each bucket contains rules that do not have inter-dependency in execution order. Then, for each bucket, subsets of rules designed to update a common business object are determined, and a corresponding single instruction set is generated for each determined subset of rules. The instruction sets generated for the subsets of rules contained in each bucket are then executed concurrently.

According to another aspect of the present disclosure, the subsets of rules determined in a bucket are sent for display, while indicating that each of the subsets of rules can be merged (that is, a single instruction set can be generated). As such, the generating of instruction sets corresponding to the subsets of rules is performed only if an input data is received, from a business user of the financial application, indicating that each of the subsets of rules is to be merged.

Accordingly, the business user is facilitated to indicate the specific subsets that are to be merged (and a single instruction set generated), and which subsets are not to be merged (that is, individual instructions sets for each rule is to be generated). Thus if the input data (received from the business user) indicates that a specific rule in a subset of rules is to be excluded from merging, the corresponding single instruction set for the subset of rules is generated excluding the specific rule (that is, only for the other rules in the subset).

According to one more aspect of the present disclosure, a precedence data is received indicating a corresponding set of business rules that are to be executed prior to execution of each business rule. Accordingly, the buckets are formed such that the corresponding set of business rules is not included in the same bucket containing the business rule (since the business rule has a dependency on the corresponding set of business rules for execution).

According to yet another aspect of the present disclosure, the business objects used by the financial application are stored in a relational database server. As such, each business rule, if executed independently, would be implemented as a corresponding SQL (structured query language) command directed to the relational database server. Also, the corresponding single instruction set is implemented in the form of a single SQL command directed to the relational database server. Accordingly, the different SQL commands that would be executed corresponding to the rules in a subset are replaced by the single SQL command.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing end user systems 110A-110Z, Internet 120, intranet 130, server systems 140A-140C, administrator system 150, and data stores 180A-180B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 130 represents a network providing connectivity between server systems 140A-140C, administrator system 150 and data stores 180A-180B all provided within an enterprise (shown with dotted boundaries). Internet 120 extends the connectivity of these (and other systems of the enterprise) with external systems such as end user systems 110A-110Z. Each of intranet 140 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

An IP packet is said to be directed to a destination system when the destination IP address of the packet is set to the IP address of the destination system, such that the packet is eventually delivered to the destination system by networks 120 and 130. When the packet contains content such as port numbers, which specifies the destination application, the packet may be said to be directed to such application as well. The destination system may be required to keep the corresponding port numbers available/open, and process the packets with the corresponding destination ports. Each of Internet 120 and intranet 130 may be implemented using any combination of wire-based or wireless mediums.

Each of data stores 180A-180B represents a non-volatile (persistent) storage facilitating storage and retrieval of a collection of data by applications (such as financial application, analytical frameworks, etc.) executing in other systems of the enterprise such as server systems 140A-140C and administrator system 150. In one embodiment, the data maintained in data stores 180A-180B is modeled (and accordingly accessed by the applications) as business objects, attributes and object instances (as noted above in the Background Section).

Each of the data stores 180A-180B may be implemented as a database server using relational database technologies and accordingly provide storage and retrieval of data using structured queries such as SQL (Structured Query Language). Alternatively, each data store may be implemented as a file server providing storage and retrieval of data in the form of files organized as one or more directories, as is well known in the relevant arts.

Each of end user systems 110A-110Z represents a system such as a personal computer, workstation, mobile station, mobile phones, computing tablets, etc., used by users to generate and send user requests directed to specific systems of the enterprise. The user requests may be generated using appropriate user interfaces (for example, web pages provided by applications executing in the enterprise). For example, the users may send user requests for performing various tasks to financial applications executing in server systems 140A-140C.

Each of server systems 140A-140C represents a server, such as a web/application server, executing financial application capable of performing tasks requested by users using end user systems 110A-110Z. In response to receiving requests from end user systems, each server system performs the tasks specified in the requests and sends the result of performance of the tasks to the requesting end user system. Each server system may use data stored internally (for example, in a non-volatile storage/hard disk within the server), external data (e g, maintained in data stores 180A-180B) and/or data received from external sources (e.g., from the user) in performing such tasks.

Administrator system 150, represents a server, such as a web/application server, that facilitates users to manage (create, update, delete) the corresponding data accessed by the different financial applications executing in server system 140A-140C. In one embodiment, an analytical framework executing in administrator system 150 facilitates business users to specify business rules for updating the business objects, with the framework then converting the business rules/business objects to corresponding instruction sets (for example, SQL queries) as suitable to the implementation of data stores 180A-180B. An example of such an analytical framework is Oracle Financial Services Analytical Applications (OFSAA) available from Oracle Corporation, the intended assignee of the instant application.

In one prior approach, the analytical framework converts each business rule into a corresponding instruction set (that is, the number of instruction sets equals the number of business rules). It is accordingly desirable that an optimal (lesser) number of instruction sets be generated for a given set of business rules. Administrator system 150, extended according to several aspects of the present disclosure, facilitates the generation of such optimal instruction sets implementing business rules designed to update business objects of financial application, as described below with examples.

3. Generating Instruction Sets Implementing Business Rules

Figure 2:
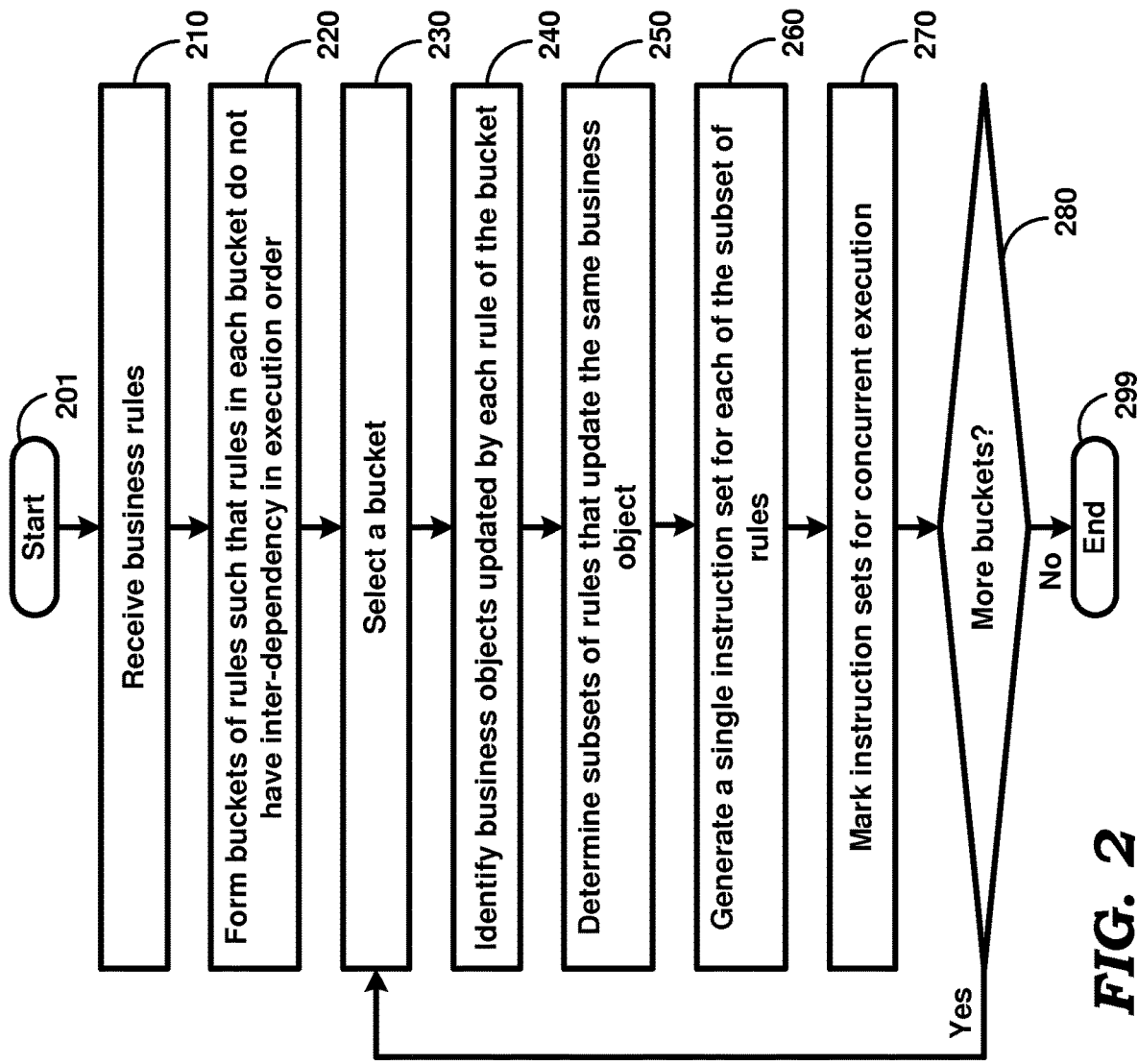
FIG. 2 is a flow chart illustrating the manner in which instruction sets implementing business rules designed to update business objects of financial applications are generated according to an aspect of the present disclosure.

FIG. 2 is a flow chart illustrating the manner in which instruction sets implementing business rules designed to update business objects of financial applications are generated according to an aspect of the present disclosure. The flowchart is described with respect to FIG. 1, in particular, administrator system 150 merely for illustration. However, many of the features can be implemented in other environments (and using potentially other types of systems/servers) also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, administrator system 150 receives business rules to be applied to the business objects. The business rules may be received from a (business) user using one of end user systems 110A-110Z.

In step 220, administrator system 150 forms buckets of rules such that rules in each bucket do not have inter-dependency in execution order. Inter-dependency is said to exist if the execution of a later rule is required to commence only after completion of execution of a prior rule in the execution order. In the absence of such inter-dependency, both rules can potentially be performed concurrently.

In an embodiment described below, a user specifies a precedence data/ordering (i.e., manual indication of which prior rules have to be completed for performance of a given rule), though such or other dependencies may be inferred by examining the inputs and outputs specified for each rule. In such a scenario, administrator system 150 ensures that the prior rules are not included in the bucket containing the given rule.

In step 230, administrator system 150 selects a bucket from the one or more buckets formed at step 220. In particular, a bucket whose rules have not been processed (as per steps 240 through 270 described below) is selected. The selection of such unprocessed bucket may be performed in a known way. For example, each bucket may be associated with a flag indicating whether the corresponding bucket has been processed (a first value) or not (a second value). Accordingly, administrator system 150 may select a bucket whose flag is set to the second value.

In step 240, administrator system 150 identifies business objects (and corresponding attributes) updated by each rule of the selected bucket. The identification of the business objects updated may be determined by examining a meta-data maintained by the analytical framework.

In step 250, administrator system 150 determines subsets of rules that update the same business object. In other words, the rules in a bucket that update a same business object are included in the same subset. In an embodiment, the determined subsets of rules are sent for display on a display unit (associated with one of end user systems 110A-110Z) while indicating that each of the subsets of the rules can be merged (that is, a single instruction set can be generated). A business user is enabled to select the specific subsets and/or the specific rules in each subset to be merged. The description is continued assuming that an input data indicating that all of the subsets of rules are to be merged is received from the business user.

In step 260, administrator system 150 generates a single instruction set for each of the subset of rules. The single instruction set generated for a subset is designed to perform the updates of the values (as determined by the rules in the subset) for the attributes of the business object (corresponding to the subset). In an embodiment, the single instruction set is formed as a single SQL statement, for example, as a "MERGE" statement having multiple columns for update.

In step 270, administrator system 150 marks the different instruction sets (generated for different subsets of rules) for concurrent execution. In other words, if four subsets of rules are formed in step 250, the corresponding four instruction sets can be executed concurrently.

In step 280, administrator system 150 checks whether there are more buckets to be processed (that is, whose flag is set to the second value). Prior to such checking, administrator system 150 first sets the flag associated with the selected bucket to the first value to indicate that the selected bucket as been processed. Control passes to step 230 if there are more buckets, wherein a new (not yet processed) bucket is selected or to step 299 otherwise (after all the buckets have been processed). The flowchart ends in step 299.

Thus, by identifying which of a given set of business rules can be combined into a single instruction set, optimal instruction sets may be generated for the given set of business rules. Furthermore, by enabling a business user to select the specific business rules to be merged, it may be appreciated that the selection of the rules may be performed based on business/financial considerations, rather than based on the underlying implementation of the business objects.

The manner in which administrator system 150 may perform the generation of instruction sets according to FIG. 2 is illustrated below with examples.

4. Illustrative Example

FIGS. 3A-3B and 4A-4B together illustrate the manner in which instructions sets implementing business objects designed to update business objects of financial applications are generated in one embodiment. Each of the Figures is described in detail below.

Figure 3A:
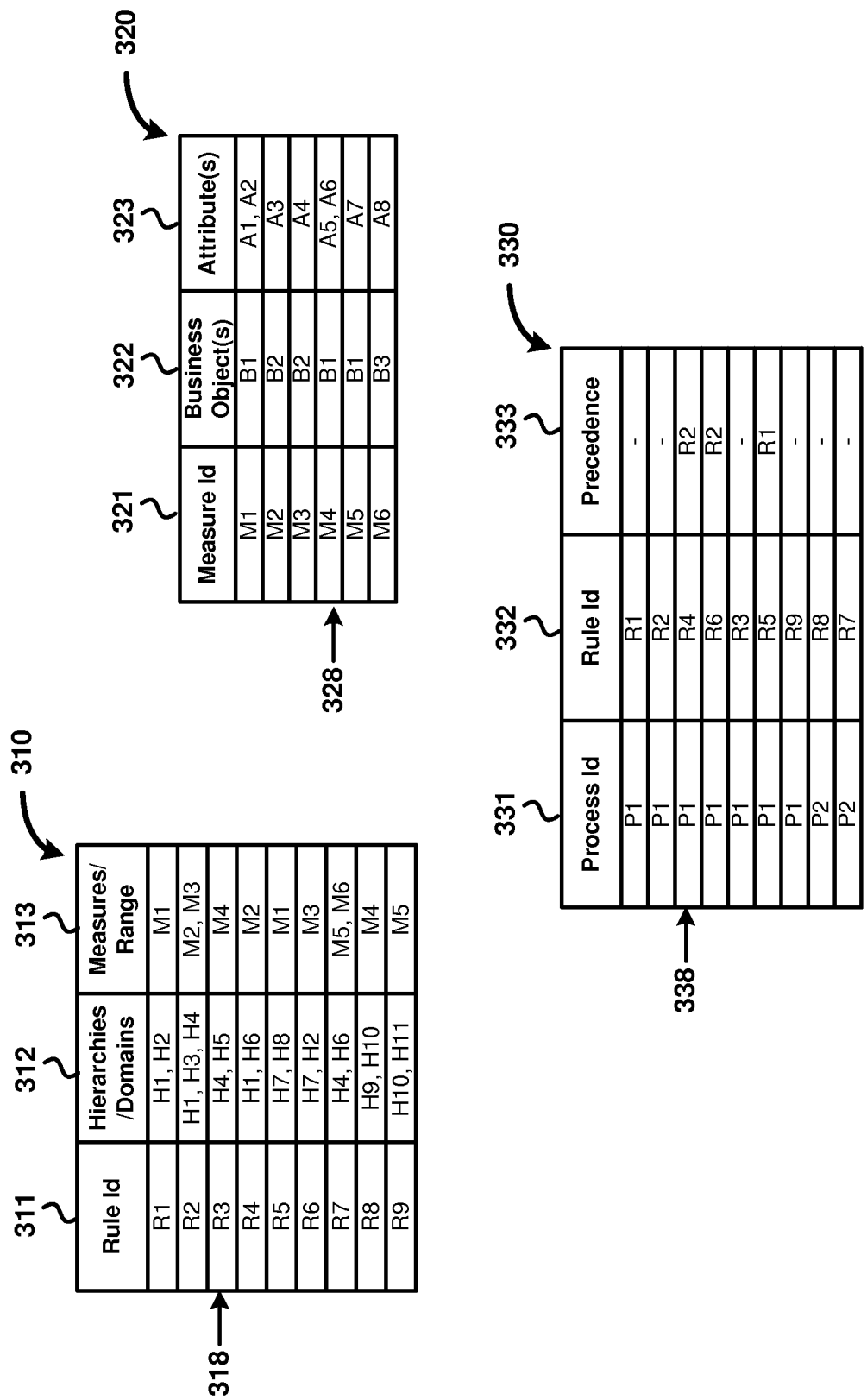
FIG. 3A illustrates the manner in which business rules are specified for execution in one embodiment.

FIG. 3A illustrates the manner in which business rules are specified for execution in one embodiment. For illustration, the business rules are shown specified in the form of a table (having rows and columns). However, in alternative embodiments, the business rules may be specified in any convenient manner, using appropriate user interfaces. An example user interface for specifying business rules is described in detail in US Publication No. 20140101154, entitled "SIMPLIFYING GROUPING OF DATA ITEMS STORED IN A DATABASE".

Thus, table 310 depicts a set of business rules specified in the analytical framework by a business user using one of end user systems 110A-110Z. Column 311 ("Rule Id") specifies a unique identifier (such as R1, R2, etc.) of the business rule, column 312 ("Hierarchies/Domains") specifies a corresponding sets of values (named H1, H2, etc.) that are used as inputs by the business rule, and column 313 ("Measures/Range") specifies the attributes (of various business objects) such as M1, M2, etc. that are updated by the business rule.

Each hierarchy/domain represents a corresponding set of potential values that may be stored in an attribute of a business object. The potential values are organized in the form of a tree data structure, well known in the arts. Each measure represents a corresponding one or more attributes (in a business object) that are to be updated with the result of performing an associated set of computations. When business objects are stored in a relational database system, each hierarchy represents the potential values that may be stored in a column in the database system, while each measure represents a column (of a table) in the database system.

Each of the rows of table 310 specifies a corresponding business rule to be employed for updating business objects of a financial application. In general, each business rule specifies for various combinations of the values of the hierarchies/domains (the inputs in column 312), corresponding computations whose resultant values are to be stored in the measures/range (in column 313). For example, row 318 indicates that a business rule uniquely identified by the name "R3" specifies for various combinations of the values in hierarchies H4 and H5 corresponding computations whose resultant values are updated in measure M4. Similarly, other rows specify the details of corresponding business rules.

Table 320 depicts a set of measures specified in the analytical framework, typically by a developer/administrator of the analytical framework. Column 321 ("Measure Id") specifies a unique identifier (such as M1, M2, etc.) of the measure, while columns 322 ("Business Object(s)") and 323 ("Attribute(s)") specifies the corresponding business objects and attributes represented by the measure.

Each of the rows of table 320 specifies a corresponding measure that may be updated by business rules specified in the analytical framework. For example, row 328 indicates that the measure M4 (updated by rule R3 as indicated by row 318) corresponds to attributes A5 and A6 contained in the business object B1. Similarly, other rows specify the details of corresponding measures used in the analytical framework.

Table 330 depicts a set of processes defined as part of a run definition in the analytical framework. A run definition represents an application process flow which is specified in the form of a sequence of processes/steps (performed in a sequential order). A business user may indicate one or more components (such as a business rule) provided by the analytical framework as a process in the run definition. In the description below, the various processes of the run definition are assumed to indicate only business rules.

Thus, table 330 depicts a set of process steps specified in the analytical framework by a business user using one of end user systems 110A-110Z. Column 331 ("Process Id") specifies an identifier (such as P1, P2, etc.) of the process for the process step. It should be noted that the same process identifier may be repeated in multiple rows to indicate that the corresponding process steps specifies in the multiple tows are part of the same process. Column 332 ("Rule Id") specifies the identifier of a business rule that is to be executed as the process step, and column 333 ("Precedence") indicates which prior business rules have to be completed for performance of the business rule specified in the corresponding process step. The lack (as indicated by the symbol "-") of a prior business rule implies that the business rule (such as R1, R2, R3) may be executed concurrently.

Each of the rows in table 330 specifies a sequence of processes (P1, P2), with each process indicated to execute a corresponding set of business rules. For example, process P1 is indicated (based on the same identifier P1 in column 331) to execute business rules R1, R2, R4, R6, R3, R5 and R9 as corresponding process steps. Some of the business rules are shown (in column 333) as having an inter-dependency on prior business rules implying that the execution of the business rule is to be commenced only after the completion of execution of the one or more prior business rules. For example, row 338 indicates that rule R4 has inter-dependency on rule R2 to imply that the execution of rule R4 can be commenced only after the completion of execution of rule R2.

It may be appreciated that the sequence and precedence noted above enforces an execution order among the business rules. In the disclosure herein, it is assumed that a business user checks for various conditions that can cause inter-dependency and specifies the sequence in line with the conditions present among the business rules. For example, the business user may check whether two business rules update measures that are mapped to the same attribute in the same business object, and accordingly specify that inter-dependency exists between the two business rules. In alternative embodiments, such inter-dependency in execution order may be determined by administrator system 150 by inspecting the various measures updated by each business rule.

Thus, a business user is enabled to specify the desired measures corresponding to attributes of business objects of a financial application, business rules for updating the measures (and correspondingly the attributes of the business objects), and a run definition specifying a sequence of business rules to be executed according to a desired execution order. The manner in which the user specified business rules may be processed by administrator system 150 to generate optimal instructions sets is described below with example.

5. Processing Business Rules

Figure 3B:
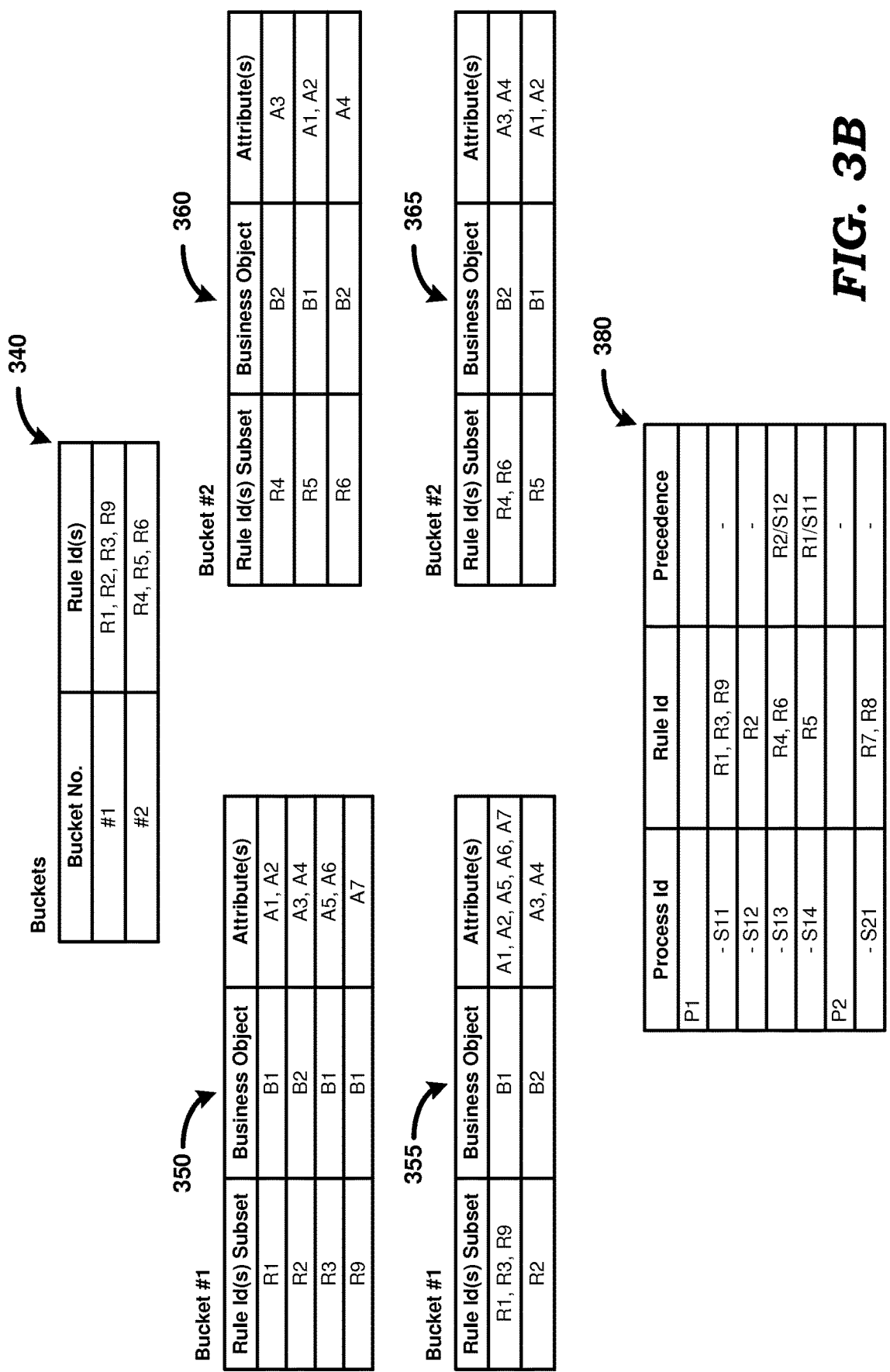
FIG. 3B illustrates the manner in which business rules are processed according to several aspects of the present disclosure in one embodiment.

FIG. 3B illustrates the manner in which business rules are processed in one embodiment. In particular, the processing of the business rules specified in FIG. 3A for the process P1 is shown in FIG. 3B and is described in detail below.

Administrator system 150, in response to receiving the run definition of table 330, first forms buckets of rules for the process P1 such that the rules in each bucket do not have inter-dependency in execution order. In general, business rules having no rules indicated (by the symbol "-") in the precedence data of column 333 are grouped into a common bucket. Any business rule having a prior business rule indicated in the precedence data is then grouped into other buckets based on the bucket to which the prior rule belongs. In particular, the prior rules are not included in the same bucket as the business rule.

Table 340 specifies the set of buckets formed for the business rules in process P1 of the received run definition (table 330). Each bucket (such as #1, #2) is shown containing a corresponding group/set of rules (such as {R1, R2, R3, R9} and {R4, R5, R6}). It may be noted that bucket #1 is formed from the rules having no precedence rules (as indicated by '-' in table 330). The other rules R4, R5 and R6 are shown grouped into bucket #2 since all the rules have corresponding precedence rules belonging to the same bucket #1.

Administrator system 150 may thereafter process each bucket of rules. Tables 350 and 355 together illustrates the manner in which the rules in bucket #1 are processed, while tables 360 and 365 together illustrates the manner in which the rules in bucket #2 are processed. The manner in which the rules in bucket #1 are processed is described in detail below.

Administrator system 150 first identifies the business objects (and attributes) updated by each business rule in bucket #1. The identification may be performed by first identifying the measures updated by each business rule based on table 310, and thereafter determining the specific attributes/business objects corresponding to the updated measures based on table 320. Tables 350 depicts the business objects (B1 and B2) and corresponding attributes (such as A1, A2, etc.) identified by administrator system 150 for the business rules in bucket #1 (that is, {R1, R2, R3, R9}).

Administrator system 150 then determines subsets of rules that update the same business object. Table 355 indicates the various subsets of rules determined for bucket #1. It may be observed that the rules R1, R3 and R9 are shown to be included in a first subset as all these rules update the same business object B1, while rule R2 is shown included in a second subset as the rule R2 update a different business object B2.

Administrator system 150 then generates a single instruction set for the rules {R1, R3, R9} and another instruction set for the rules {R2}. Similarly, administrator system 150 processes (as shown in tables 360 and 365) the rules in bucket #2 (that is, {R4, R5, R6}), and generate respective instruction sets for the subsets {R4, R6} and {R5}. It may be observed that only 4 instruction sets are generated corresponding to the four subsets of rules determined for the process P1. This is in contrast to the 7 instructions sets that would have been generated (corresponding to the seven business rules in process P1) in the prior approach noted above.

Table 380 illustrates the manner in which the determined subsets of rules are provided to a business user as part of a run definition. Table 380 is similar to table 330, and accordingly the description of the common elements is not repeated here for conciseness. It may be observed that each subset of rules is shown as a sub-process (such as S11, S12, S21, etc.) under the corresponding process (P1, P2) in the run definition. Each sub-process is shown containing the various rules determined to be in the subset by administrator system 150. For example, sub-process S11 corresponds to the subset of rules {R1, R3, R9} determined by administrator system 150 for bucket #1 (as shown in table 355).

In one embodiment, administrator system 150 generates a single instruction set for the various rules specified as part of a sub-process. Accordingly, the determined subsets of rules that are to be merged are shown as corresponding sub-processes in table 380. However, in alternative embodiments, the sub-processes may be used merely for visual representation of the subsets. Administrator system 150 may then store additional data (for example, a number indicating the subset) indicating the rules that belong to the various subsets, and accordingly generate single instructions sets based on the additional data.

According to an aspect of the present disclosure, the determined subsets of rules are displayed to a business user, for example, on a display unit (not shown in FIG. 1) associated with one of end user systems 110A-110Z. The merging (generation of the single instruction set) of the subsets of business rules is performed only in response to an input data (received from the business user) indicating that such merging (of the corresponding subsets) is to be performed. The manner in which administrator system 150 may display the determined subsets and receive input data from business users (using end user system 110A-110Z) is described below with examples.

6. Displaying Business Rules for Merging

Figure 4A:
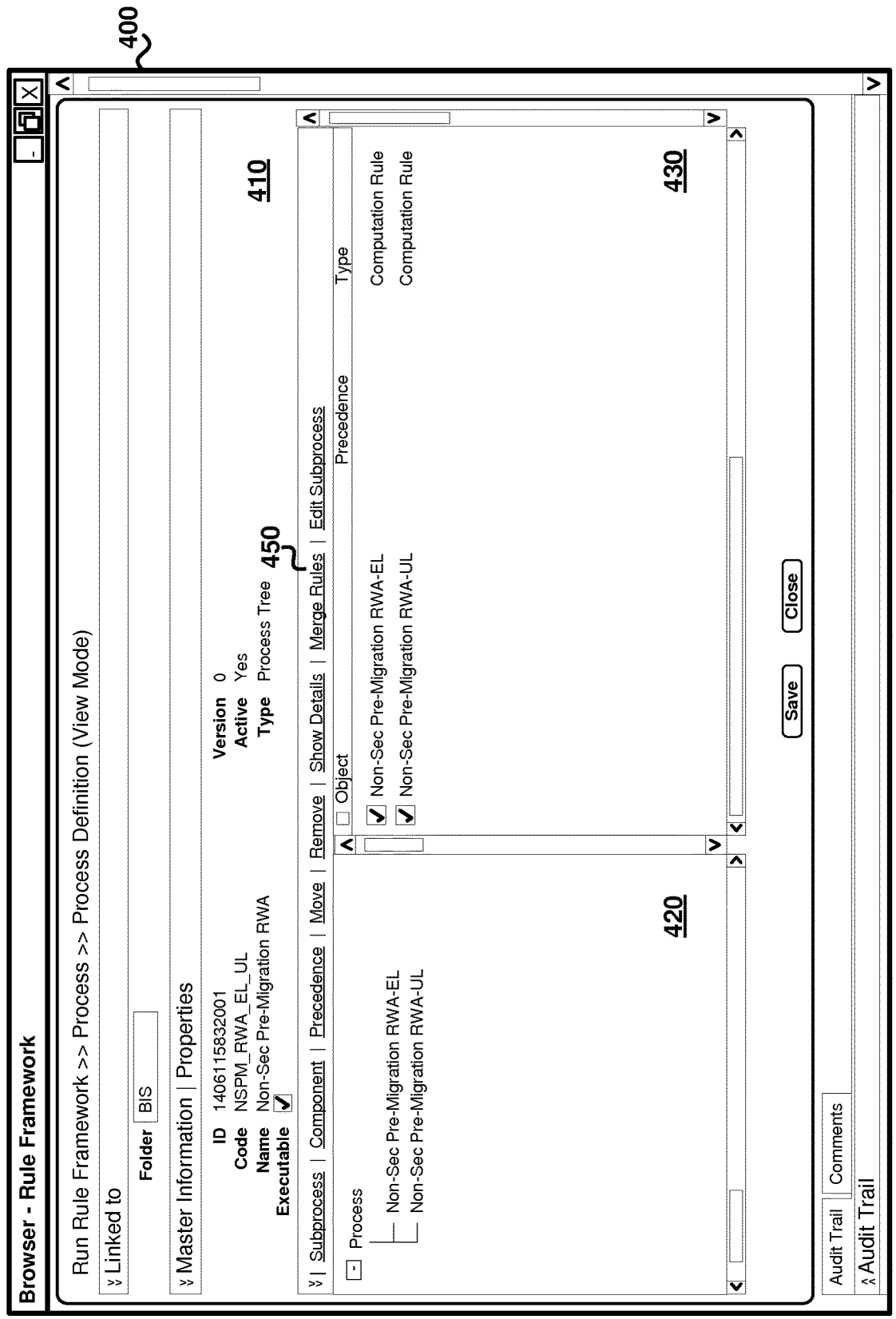
FIG. 4A illustrates the manner in which the subsets of business rules determined as being suitable for merging are displayed to a business user in one embodiment.

FIG. 4A illustrates the manner in which the subsets of business rules determined as being suitable for merging are displayed to a business user in one embodiment. Display area 400 depicts a portion of a user interface provided on a display unit (not shown in FIG. 1) associated with one of end user systems 110A-110Z (assumed to be 110A for illustration). In one embodiment, display area 400 corresponds to a browser displaying respective web pages provided by administrator system 150. The web pages are provided in response to a business user sending appropriate requests (for example, by specifying corresponding URLs) using the browser in end user system 110A.

In particular, the user interface of display area 400 facilitates a business user to view (and edit) the details of a process/run definition. Display area 410 provides the details such as the name, type, version, etc. of the process definition. Display area 420 depicts the hierarchy of the process steps specified as part of the process definition. In particular, display area 420 indicates that the process contains two steps named "Non-Sec Pre-Migration RWA-EL" and "Non-Sec Pre-Migration RWA-UL".

Display area 430 specifies the details of each of the process steps specified in the process definition. In particular, display area 430 indicates a unique identifier of each object/process step (same as in display area 420), the precedence of the object (indicating which prior steps/objects/business rules are to be executed before execution of the corresponding step) and the type of the object. It may be observed that the object type of both the objects/process steps is indicated to be a business/Computation Rule.

It may be further observed that both of the objects are shown to be selected (by the selection of the corresponding checkboxes) indicating that the subset of the two objects/business rules can be merged (and a single instruction set generated). It should be noted that in alternative embodiments, any appropriate visual highlighting (such as usage of a same color, font, etc.) may be used to indicate the specific subsets of rules that can be merged. For example, all the rules that cannot be merged may be displayed in a common color, while each subset of rules may be displayed with a corresponding unique color (different from the common color).

Accordingly, a business user is enabled to indicate the specific subsets that are to be merged using the user interface of display area 400. For example, the business user may exclude a business rule in a subset (by removing the selection in the corresponding checkbox). In addition, the business user may observe (based on the indication/visual highlighting of the subsets), that a specific rule is not included in a subset of rules in view of the specific rule not updating the common business object updated by the other rules in the subset. The business user may accordingly modify the specific rule to form a modified rule (that updates the common business object) and then perform the determination of the subsets to cause the modified rule to be included in the subset (and displayed in display area 430).

After the business user has selected the subsets to be merged, the business user clicks/selects "Merge Rules" link/button 450 to indicate that the selected subsets of rules (here "Non-Sec Pre-Migration RWA-EL" and "Non-Sec Pre-Migration RWA-UL") are to be merged. In response, administrator system 150 creates sub-processes corresponding to each of the subsets of business rules indicated to be merged (by the input data received from the business user in display area 430). Administrator system 150 may then display the created sub-processes to the business user as described in detail below.

Figure 4B:
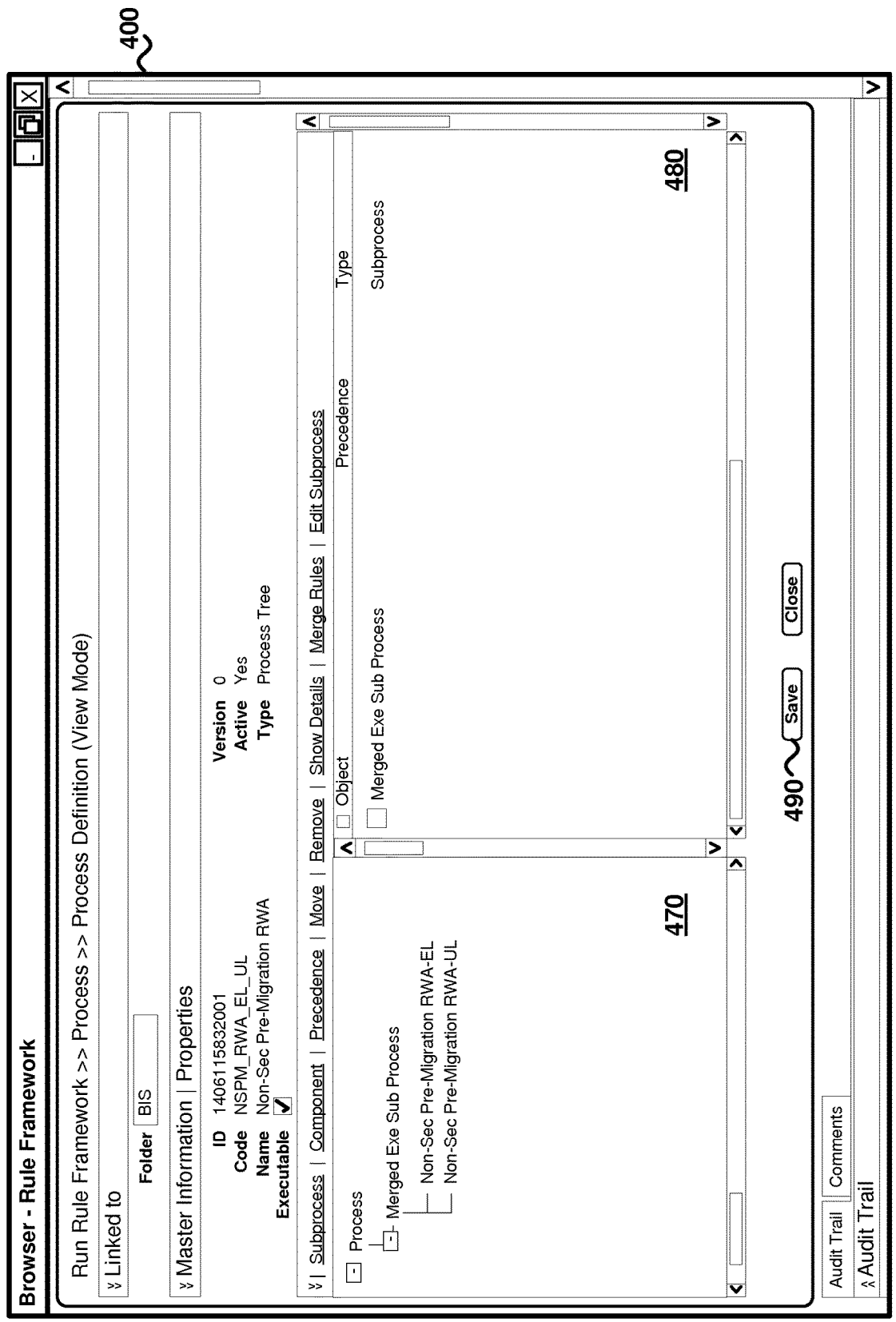
FIG. 4B illustrates the manner in which the results of merging subsets of business rules are displayed to a business user in one embodiment.

FIG. 4B illustrates the manner in which the results of merging subsets of business rules are displayed to a business user in one embodiment. In particular, FIG. 4B depicts the results in response to the user clicking on the "Merge Rules" link 450 in FIG. 4A.

Display area 470 depicts the hierarchy of the process steps after merging of the corresponding subsets of business rules. It may be observed that display area 470 indicates that a new process step named "Merged Exe Sub Process" has been created with the previous two steps "Non-Sec Pre-Migration RWA-EL" and "Non-Sec Pre-Migration RWA-UL" being shown under the new process step. Display area 480 indicates that the new process step "Merged Exe Sub Process" is a sub-process (as indicated by the type).

Thus, a business user is displayed the results of merging subsets of business rules in the form of various sub-processes of a process definition. The business user may thereafter click/select "Save" button 490 to indicate that the process definition, including the various subsets of business rules to be merged is to be saved/stored as part of the process definition. In response to executing the saved process/run definition (of FIG. 4B), administrator system 150 generates a single instruction set for the process step "Merged Exe Sub Process", and then executes the single instruction set (concurrently with other single instruction sets) to cause the specific measures to be updated based on corresponding computations.

In one embodiment, the business objects used by the financial application are stored in a relational database server. As such, each business rule, if executed independently, is implemented as a corresponding SQL (structured query language) command directed to the relational database server. Appendix A depicts the SQL command that may be generated and executed by administrator system 150 if the business rule "Non-Sec Pre-Migration RWA-EL" is independently executed. Similarly, Appendix B depicts the SQL command that may be generated for the business rule "Non-Sec Pre-Migration RWA-UL". The single instruction set, upon executing, is also implemented in the form of a single SQL command directed to the relational database server. Appendix C depicts the SQL command that may be generated as the single instruction set for the merged subset of rules/sub-process "Merged Exe Sub Process".

It should be further appreciated that the features described above can be implemented in various embodiments as a desired combination of one or more of hardware, executable modules, and firmware. The description is continued with respect to an embodiment in which various features are operative when the instructions in the executable modules are executed.

7. Digital Processing System

Figure 5:
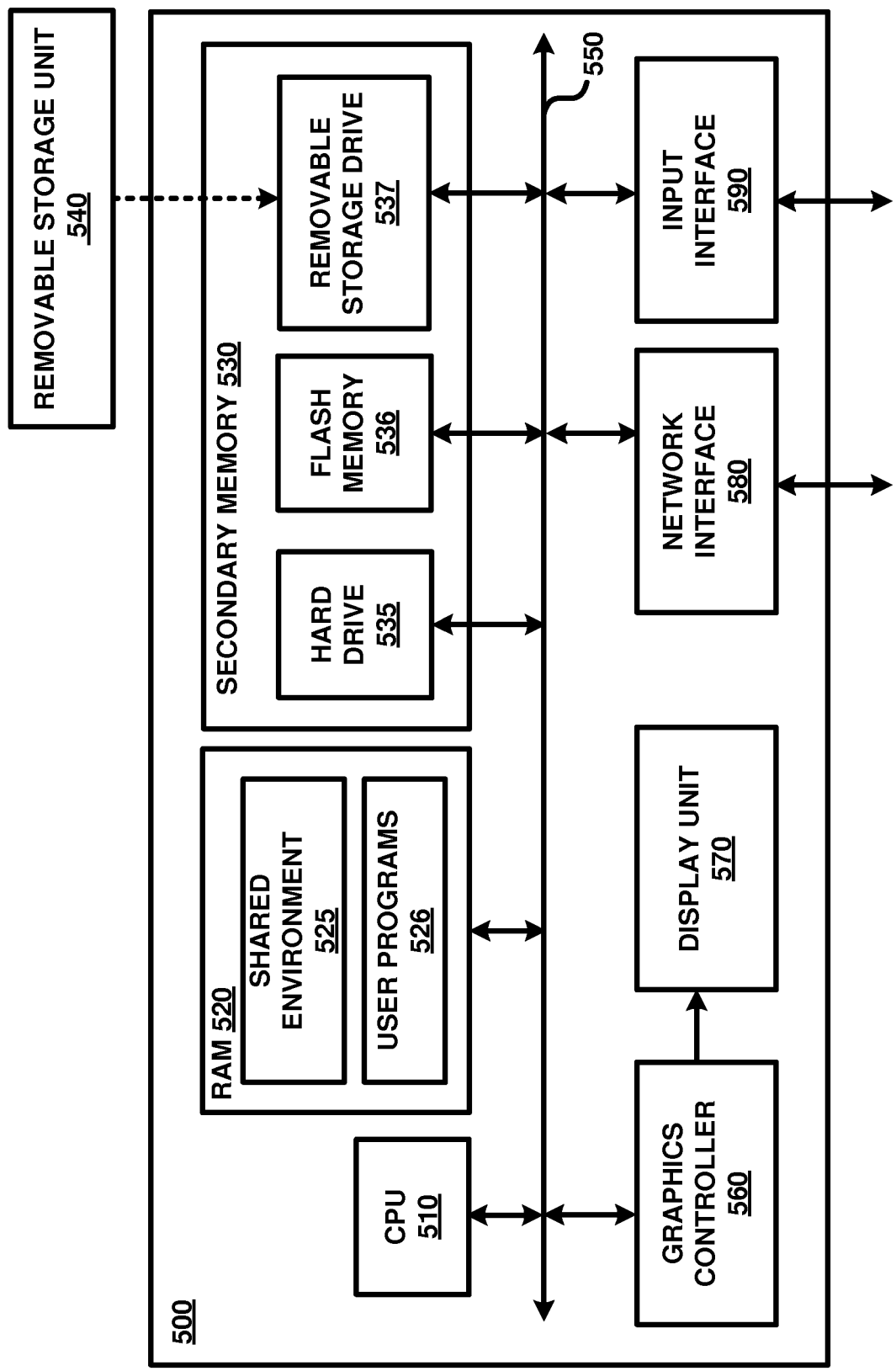
FIG. 5 is a block diagram illustrating the details of a digital processing system in which several aspects of the present disclosure are operative by execution of appropriate software instructions.

FIG. 5 is a block diagram illustrating the details of digital processing system 500 in which several aspects of the present disclosure are operative by execution of appropriate software instructions. Digital processing system 500 corresponds to administrator system 150.

Digital processing system 500 may contain one or more processors (such as a central processing unit (CPU) 510), random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550.

RAM 520 is shown currently containing software instructions constituting shared environment 525 and/or user programs 526 (such as financial applications, analytical framework, etc.). Shared environment 525 contains utilities shared by user programs, and such shared utilities include operating system, device drivers, virtual machines, flow engines, etc., which provide a (common) run time environment for execution of user programs 526.

Graphics controller 560 generates display signals (e.g., in RGB format) to display unit 570 based on data/instructions received from CPU 510. Display unit 570 contains a display screen to display the images defined by the display signals (such as the portions of the user interfaces of FIGS. 4A-4B). Input interface 590 may correspond to a keyboard and a pointing device (e.g., touch-pad, mouse) that may be used to provide various inputs (such as to specify the desired inputs, etc. in the user interfaces of FIGS. 4A-4B). Network interface 580 provides connectivity to a network (e.g., using Internet Protocol), and may be used to communicate with other connected systems (such as server systems 130A-130C, data stores 180A-180B).

Secondary memory 530 may contain hard drive 535, flash memory 536, and removable storage drive 537. Secondary memory 530 represents a non-transitory medium, which may store the data (for example, portions of data shown in FIGS. 3A-3B) and software instructions (for example, for performing the steps of FIG. 2), to enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Secondary memory 530 may contain hard drive 535, flash memory 536, and removable storage drive 537. Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX A

SQL generated for Non-Sec Pre-Migration RWA-EL

```
merge INTO fct_non_sec_exposures TT
USING (SELECT *
   FROM (SELECT fct_non_sec_exposures.n_acct_skey,
      fct_non_sec_exposures.n_gaap_skey,
      fct_non_sec_exposures.n_run_skey,
      fct_non_sec_exposures.n_mis_date_skey,
      ( fct_non_sec_exposures. n_pre_mitigation_rwa_el ) AS
      T_1137668671329_0,
```

APPENDIX A-continued

SQL generated for Non-Sec Pre-Migration RWA-EL

```
      (CASE WHEN ( ((( 1 = 1 )))
         AND NOT ( ((( CASE
            WHEN
               dim_basel_asset_class.f_latest_record_indicator = 'Y'
            THEN
      dim_basel_asset_class.v_basel_asset_class_code_lvl1
      END = 'EQ' )))
      OR ((( CASE
         WHEN
      dim_basel_asset_class.f_latest_record_indicator = 'Y'
         THEN
      dim_basel_asset_class.v_basel_asset_class_code_lvl1
      END = 'EQ' ))) ) ) THEN 10
      ELSE 11
      END)                                                   AS
         COND_1137668671329_10,
      ( CASE
      WHEN 1 = 1 THEN fct_non_sec_
      exposures.n_pre_mitigation_el_amt
      ELSE NULL
      END * 12.5)                                             AS
         EXP_1137668671329_10,
      ( fct_non_sec_exposures. n_pre_mitigation_rwa_el ) AS
         EXP_1137668671329_11
      FROM fct_non_sec_exposures
         left outer join dim_cleared_txn_bank_role
            ON
         dim_cleared_txn_bank_role.n_cleared_txn_bank_role_id =
         fct_non_sec_exposures.n_cleared_txn_bank_role_id
         left outer join dim_basel_credit_rating
            ON dim_basel_credit_rating.n_basel_rating =
               fct_non_sec_exposures.n_basel_rating
         left outer join dim_basel_asset_class
            ON
         dim_basel_asset_class.n_basel_asset_class_skey =
         fct_non_sec_exposures.n_basel_asset_class_skey
         left outer join dim_basel_product_type
            ON
         dim_basel_product_type.n_basel_prod_type_skey =
         fct_non_sec_exposures.n_basel_prod_type_skey
         left outer join dim_basel1_product_type
            ON
         dim_basel1_product_type.n_basel1_prod_type_skey=
         fct_non_sec_exposures.n_basel1_prod_type_skey
         left outer join dim_product
            ON fct_non_sec_exposures.n_prod_skey =
               dim_product. n_prod_skey
         left outer join dim_oecd_indicator
            ON dim_oecd_indicator.f_oecd_indicator =
         fct_non_sec_exposures.f_oecd_indicator
         left outer join dim_party_type
            ON dim_party_type.n_party_type_skey =
      fct_non_sec_exposures.n_counterparty_type_skey
      left outer join dim_exposure_underlying_type
      ON
      dim_exposure_underlying_type.n_underlying_type_skey =
      fct_non_sec_exposures.n_underlying_type_skey
      left outer join dim_standard_party_type
      ON
      dim_standard_party_type.n_standard_party_type_skey =
      fct_non_sec_exposures.n_std_counterparty_type_skey
      left outer join dim_basel_transaction_type
      ON dim_basel_transaction_type.n_basel_txn_type_skey=
      fct_non_sec_exposures.n_basel_txn_type_skey
      left outer join dim_lob
      ON dim_lob.n_lob_skey =
      fct_non_sec_exposures.n_lob_skey
      left outer join dim_run
      ON fct_non_sec_exposures.n_run_skey =
      dim_run. n_run_skey
      left outer join dim_basel1_customer_type
      ON dim_basel1_customer_type.n_basel1_cust_type_skey=
      fct_non_sec_exposures.n_basel1_cust_type_skey
      left outer join dim_gaap
      ON fct_non_sec_exposures.n_gaap_skey =
      dim_gaap.n_gaap_skey
      left outer join dim_dates
```

APPENDIX A-continued

SQL generated for Non-Sec Pre-Migration RWA-EL

```
ON fct_non_sec_exposures.n_mis_date_skey =
dim_dates.n_date_skey
left outer join dim_country
ON fct_non_sec_exposures.n_country_skey =
dim_country.n_country_skey
left outer join dim_industry
ON fct_non_sec_exposures.n_d_cust_industry_skey =
dim_industry.n_d_cust_industry_skey
left outer join dim_standard_acct_head
ON fct_non_sec_exposures.n_std_acct_head_skey =
dim_standard_acct_head.n_std_acct_head_skey
left outer join dim_basel_methodology
ON fct_non_sec_exposures.n_basel_method_skey =
dim_basel_methodology.n_basel_method_skey.
left outer join dim_basel1_issuer_type
ON dim_basel1_issuer_type.n_basel1_issuer_type_skey=
fct_non_sec_exposures.n_basel1_issuer_type_skey
left outer join dim_business_unit
ON fct_non_sec_exposures.n_business_unit_skey =
dim_business_unit.n_business_unit_skey
left outer join dim_run_identifier
ON fct_non_sec_exposures.n_run_identifier_skey =
dim_run_identifier.n_run_identifier_skey
left outer join run_parameters
ON fct_non_sec_exposures.n_run_parameter_setup_skey=
run_parameters.n_run_parameter_setup_skey
AND run_parameters.n_run_skey =
fct_non_sec_exposures.n_run_skey
AND run_parameters.n_date_skey =
fct_non_sec_exposures.n_mis_date_skey
left outer join(run_exe_parameters
inner join dim_run
ON dim_run.n_run_skey = run_exe_parameters.n_run_skey
AND dim_run.n_run_skey ='$RUNSK'
inner join dim_org_structure
ON dim_org_structure.v_entity_code =
run_exe_parameters.v_param_value_code
AND dim_org_structure.f_latest_record_indicator = 'Y'
AND run_exe_parameters.n_run_skey =
dim_run.n_run_skey)
ON run_exe_parameters.n_run_skey =
fct_non_sec_exposures.n_run_skey
AND run_exe_parameters.v_param_id = 'LE'
left outer join dim_interest_type
ON dim_interest_type.n_interest_type =
fct_non_sec_exposures.n_interest_type
left outer join dim_capital_comp_group
ON fct_non_sec_exposures.n_underlying_cap_comp_grp_skey =
dim_capital_comp_group.n_cap_comp_group_skey
WHERE ( 1 = 1 )
AND ( dim_dates.d_calendar_date =$ misdate
AND dim_run.n_run_skey = '$RUNSK' ))
WHERE (( cond_1137668671329_10 <>11 ))) ss
ON ( TT.n_acct_skey=ss.n_acct_skey AND
TT.n_gaap_skey=ss.n_gaap_skey AND
TT.n_run_skey=ss.n_run_skey AND
TT.n_mis_date_skey= ss.n_mis_date_skey)
WHEN matched THEN
UPDATE SET TT.n_pre_mitigation_rwa_el = CASE
            WHEN cond_1137668671329_10 = 10 THEN
              exp_1137668671329_10
            ELSE exp_1137668671329_11
            END
```

APPENDIX B

SQL generated for Non-Sec Pre-Migration RWA-UL

```
merge INTO fct_non_sec_exposures TT
USING (SELECT *
    FROM (SELECT fct_non_sec_exposures.n_acct_skey,
        fct_non_sec_exposures.n_gaap_skey,
        fct_non_sec_exposures.n_run_skey,
        fct_non_sec_exposures.n_mis_date_skey,
        ( fct_non_sec_exposures. n_pre_mitigation_rwa_ul ) AS
```

APPENDIX B-continued

SQL generated for Non-Sec Pre-Migration RWA-UL

```
    T_1137668723538_0,
    ( CASE
        WHEN ((( 1 = 1 ))) THEN 10
        ELSE 11
        END)                                          AS
            COND_1137668723538_10,
    ( 12.5 * Coalesce(CASE
            WHEN 1 = 1 THEN
fct_non_sec_exposures.n_pre_mitigation_capital_ul
ELSE NULL
END, 0) * CASE
        WHEN 1 = 1 THEN
            fct_non_sec_exposures.n_ead_pre_mitigation
        ELSE NULL
        END)                                          AS
EXP_1137668723538_10,
( fct_non_sec_exposures. n_pre_mitigation_rwa_ul ) AS
EXP_1137668723538_11
FROM fct_non_sec_exposures
left outer join dim_cleared_txn_bank_role
ON dim_cleared_txn_bank_role.n_cleared_txn_bank_role_id =
fct_non_sec_exposures.n_cleared_txn_bank_role_id
left outer join dim_basel_credit_rating
ON dim_basel_credit_rating.n_basel_rating =
fct_non_sec_exposures.n_basel_rating
left outer join dim_basel_asset_class
ON dim_basel_asset_class.n_basel_asset_class_skey =
fct_non_sec_exposures.n_basel_asset_class_skey
left outer join dim_basel_product_type
ON dim_basel_product_type.n_basel_prod_type_skey =
fct_non_sec_exposures.n_basel_prod_type_skey
left outer join dim_basel1_product_type
ON dim_basel1_product_type.n_basel1_prod_type_skey =
fct_non_sec_exposures.n_basel1_prod_type_skey
left outer join dim_product
ON fct_non_sec_exposures.n_prod_skey =
dim_product. n_prod_skey
left outer join dim_oecd_indicator
ON dim_oecd_indicator.f_oecd_indicator =
fct_non_sec_exposures.f_oecd_indicator
left outer join dim_party_type
ON dim_party_type.n_party_type_skey =
fct_non_sec_exposures.n_counterparty_type_skey
left outer join dim_exposure_underlying_type
ON dim_exposure_underlying_type.n_underlying_type_skey =
fct_non_sec_exposures.n_underlying_type_skey
left outer join dim_standard_party_type
ON dim_standard_party_type.n_standard_party_type_skey =
fct_non_sec_exposures.n_std_counterparty_type_skey
left outer join dim_basel_transaction_type
ON dim_basel_transaction_type.n_basel_txn_type_skey =
fct_non_sec_exposures.n_basel_txn_type_skey
left outer join dim_lob
ON dim_lob.n_lob_skey = fct_non_sec_exposures.n_lob_skey
left outer join dim_run
ON fct_non_sec_exposures.n_run_skey = dim_run.n_run_skey
left outer join dim_basel1_customer_type
ON dim_basel1_customer_type.n_basel1_cust_type_skey =
fct_non_sec_exposures.n_basel1_cust_type_skey
left outer join dim_gaap
ON fct_non_sec_exposures.n_gaap_skey =
dim_gaap.n_gaap_skey
left outer join dim_dates
ON fct_non_sec_exposures.n_mis_date_skey =
dim_dates. n_date_skey
left outer join dim_country
ON fct_non_sec_exposures.n_country_skey =
dim_country. n_country_skey
left outer join dim_industry
ON fct_non_sec_exposures.n_d_cust_industry_skey =
dim_industry.n_d_cust_industry_skey
left outer join dim_standard_acct_head
ON fct_non_sec_exposures.n_std_acct_head_skey =
dim_standard_acct_head. n_std_acct_head_skey
left outer join dim_basel_methodology
ON fct_non_sec_exposures.n_basel_method_skey =
dim_basel_methodology.n_basel_method_skey.
left outer join dim_basel1_issuer_type
```

APPENDIX B-continued

SQL generated for Non-Sec Pre-Migration RWA-UL

```
        ON dim_basel1_issuer_type.n_basel1_issuer_type_skey =
            fct_non_sec_exposures.n_basel1_issuer_type_skey
        left outer join dim_business_unit
        ON fct_non_sec_exposures.n_business_unit_skey =
            dim_business_unit.n_business_unit_skey
        left outer join dim_run_identifier
        ON fct_non_sec_exposures.n_run_identifier_skey =
            dim_run_identifier.n_run_identifier_skey
        left outer join run_parameters
        ON fct_non_sec_exposures.n_run_parameter_setup_skey =
            run_parameters.n_run_parameter_setup_skey
        AND run_parameters.n_run_skey =
            fct_non_sec_exposures.n_run_skey
        AND run_parameters.n_date_skey =
            fct_non_sec_exposures.n_mis_date_skey
        left outer join(run_exe_parameters
        inner join dim_run
        ON dim_run.n_run_skey = run_exe_parameters.n_run_skey
        AND dim_run.n_run_skey = '$RUNSK'
        inner join dim_org_structure
        ON dim_org_structure.v_entity_code =
            run_exe_parameters.v_param_value_code
        AND dim_org_structure.f_latest_record_indicator = 'Y'
        AND run_exe_parameters.n_run_skey =
            dim_run.n_run_skey)
        ON run_exe_parameters.n_run_skey =
            fct_non_sec_exposures.n_run_skey
        AND run_exe_parameters.v_param_id = 'LE'
        left outer join dim_interest_type
        ON dim_interest_type.n_interest_type =
            fct_non_sec_exposures.n_interest_type
        left outer join dim_capital_comp_group
        ON fct_non_sec_exposures.n_underlying_cap_comp_grp_skey =
            dim_capital_comp_group.n_cap_comp_group_skey
        WHERE ( 1 = 1)
        AND ( dim_dates.d_calendar_date =$ misdate
        AND dim_run.n_run_skey = '$RUNSK' ))
        WHERE (( cond_1137668723538_10 <>11 ))) ss
ON ( TT.n_acct_skey= ss.n_acct_skey
AND TT.n_gaap_skey= ss.n_gaap_skey AND
TT.n_run_skey= ss.n_run_skey AND
TT.n_mis_date_skey= ss.n_mis_date_skey)
WHEN matched THEN
    UPDATE SET TT.n_pre_mitigation_rwa_ul = CASE
        WHEN cond_1137668723538_10 = 10 THEN
            exp_1137668723538_10
        ELSE exp_1137668723538_11
        END
```

APPENDIX C

SQL generated for Merged Exe Sub Process

```
merge INTO fct_non_sec_exposures TT
USING (SELECT *
    FROM (SELECT fct_non_sec_exposures.n_acct_skey,
        fct_non_sec_exposures.n_gaap_skey,
        fct_non_sec_exposures.n_run_skey,
        fct_non_sec_exposures.n_mis_date_skey,/* next target */
        ( fct_non_sec_exposures.n_pre_mitigation_rwa_el ) AS
            T_1137668671329_0,
        ( CASE
            WHEN ( ((( 1 = 1 )))
                AND NOT ( ((( CASE
                    WHEN
                    dim_basel_asset_class.f_latest_record_indicator = 'Y'
                        THEN
                    dim_basel_asset_class.v_basel_asset_class_code_lvl1
            END = 'EQ' )))
                OR ((( CASE
                    WHEN
                    dim_basel_asset_class.f_latest_record_indicator = 'Y'
                        THEN
                    dim_basel_asset_class.v_basel_asset_class_code_lvl1
            END = 'EQ' ))) ) ) THEN 10
```

APPENDIX C-continued

SQL generated for Merged Exe Sub Process

```
            ELSE 11
            END)                AS
                COND_1137668671329_10,
        ( CASE
            WHEN 1 = 1 THEN fct_non_sec_
                exposures.n_pre_mitigation_el_amt
            ELSE NULL
            END * 12.5)             AS
                EXP_1137668671329_10,
        ( fct_non_sec_exposures. n_pre_mitigation_rwa_el ) AS
            EXP_1137668671329_11,
        /* next target */
        ( fct_non_sec_exposures.n_pre_mitigation_rwa_ul ) AS
            T_1137668723538_0,
        ( CASE
            WHEN ((( 1 = 1))) THEN 10
            ELSE 11
            END)                AS
                COND_1137668723538_10,
        ( 12.5 * Coalesce(CASE
            WHEN 1 = 1 THEN
                fct_non_sec_exposures.n_pre_mitigation_capital_ul
            ELSE NULL
            END, 0) * CASE
                WHEN 1 = 1 THEN
                    fct_non_sec_exposures. n_ead_pre_mitigation
                ELSE NULL
            END)            AS EXP_1137668723538_10,
        ( fct_non_sec_exposures. n_pre_mitigation_rwa_ul ) AS
            EXP_1137668723538_11
        FROM fct_non_sec_exposures
            left outer join dim_cleared_txn_bank_role
                ON
                dim_cleared_txn_bank_
                    role.n_cleared_txn_bank_role_id =
                    fct_non_sec_exposures.n_cleared_txn_bank_role_id
            left outer join dim_basel_credit_rating
                ON dim_basel_credit_rating.n_basel_rating =
                    fct_non_sec_exposures.n_basel_rating
            left outer join dim_basel_asset_class
                ON
                dim_basel_asset_class.n_basel_asset_class_skey =
                    fct_non_sec_exposures.n_basel_asset_class_skey
            left outer join dim_basel_product_type
                ON
            dim_basel_product_type.n_basel_prod_type_skey =
                fct_non_sec_exposures.n_basel_prod_type_skey
            left outer join dim_basel1_product_type
                ON
                dim_basel1_product_type.n_
                    basel1_prod_type_skey=
                    fct_non_sec_exposures.n_basel1_prod_type_skey
            left outer join dim_product
                ON fct_non_sec_exposures.n_prod_skey =
                    dim_product. n_prod_skey
            left outer join dim_oecd_indicator
                ON dim_oecd_indicator.f_oecd_indicator =
                    fct_non_sec_exposures.f_oecd_indicator
            left outer join dim_party_type
                ON dim_party_type.n_party_type_skey =
                    fct_non_sec_exposures.n_counterparty_type_skey
            left outer join dim_exposure_underlying_type
                ON
                    dim_exposure_underlying_type.n_
                        underlying_type_skey =
                fct_non_sec_exposures.n_underlying_type_skey
            left outer join dim_standard_party_type
                ON
            dim_standard_party_type.n_standard_party_type_skey =
                fct_non_sec_exposures.n_std_counterparty_type_skey
            left outer join dim_basel_transaction_type
                ON dim_basel_transaction_type.n_basel_txn_type_skey=
                    fct_non_sec_exposures.n_basel_txn_type_skey
            left outer join dim_lob
                ON dim_lob.n_lob_skey =
                    fct_non_sec_exposures.n_lob_skey
            left outer join dim_run
```

APPENDIX C-continued

SQL generated for Merged Exe Sub Process

```
ON fct_non_sec_exposures.n_run_skey =
dim_run. n_run_skey
left outer join dim_basel1_customer_type
ON dim_basel1_customer_type.n_basel1_cust_type_skey=
fct_non_sec_exposures.n_basel1_cust_type_skey
left outer join dim_gaap
ON fct_non_sec_exposures.n_gaap_skey =
dim_gaap.n_gaap_skey
left outer join dim_dates
ON fct_non_sec_exposures.n_mis_date_skey =
dim_dates.n_date_skey
left outer join dim_country
ON fct_non_sec_exposures.n_country_skey =
dim_country.n_country_skey
left outer join dim_industry
ON fct_non_sec_exposures.n_d_cust_industry_skey =
dim_industry.n_d_cust_industry_skey
left outer join dim_standard_acct_head
ON fct_non_sec_exposures.n_std_acct_head_skey =
dim_standard_acct_head.n_std_acct_head_skey
left outer join dim_basel_methodology
ON fct_non_sec_exposures.n_basel_method_skey =
dim_basel_methodology.n_basel_method_skey.
left outer join dim_basel1_issuer_type
ON dim_basel1_issuer_type.n_basel1_issuer_type_skey=
fct_non_sec_exposures.n_basel1_issuer_type_skey
left outer join dim_business_unit
ON fct_non_sec_exposures.n_business_unit_skey =
dim_business_unit.n_business_unit_skey
left outer join dim_run_identifier
ON fct_non_sec_exposures.n_run_identifier_skey =
dim_run_identifier.n_run_identifier_skey
left outer join run_parameters
ON fct_non_sec_exposures.n_run_parameter_setup_skey=
run_parameters.n_run_parameter_setup_skey
AND run_parameters.n_run_skey =
fct_non_sec_exposures.n_run_skey
AND run_parameters.n_date_skey =
fct_non_sec_exposures.n_mis_date_skey
left outer join(run_exe_parameters
inner join dim_run
ON dim_run.n_run_skey = run_exe_parameters.n_run_skey
AND dim_run.n_run_skey = '27'
inner join dim_org_structure
ON dim_org_structure.v_entity_code =
run_exe_parameters.v_param_value_code
AND dim_org_structure.f_latest_record_indicator = 'Y'
AND run_exe_parameters.n_run_skey =
dim_run.n_run_skey)
ON run_exe_parameters.n_run_skey =
fct_non_sec_exposures.n_run_skey
AND run_exe_parameters.v_param_id = 'LE'
left outer join dim_interest_type
ON dim_interest_type.n_interest_type =
fct_non_sec_exposures.n_interest_type
left outer join dim_capital_comp_group
ON fct_non_sec_exposures.n_underlying_
cap_comp_grp_skey =
dim_capital_comp_group.n_cap_comp_group_skey
WHERE ( 1 = 1 )
AND ( dim_dates.d_calendar_date =
To_date ('20140723', 'yyyymmdd')
AND dim_run.n_run_skey = '27')
AND ( ( 1 = 1 )
AND ( 1 = 1 )
AND ( 9 = 9 ) ))
WHERE ( ( cond_1137668671329_10 <>11)
OR ( cond_1137668723538_10 <>11) )) ss
ON ( TT.n_acct_skey= ss.n_acct_skey AND
TT.n_gaap_skey= ss.n_gaap_skey AND
TT.n_run_skey= ss.n_run_skey AND
TT.n_mis_date_skey= ss.n_mis_date_skey)
WHEN matched THEN
  UPDATE SET TT.n_pre_mitigation_rwa_el = CASE
                  WHEN cond_1137668671329_
                  10 = 10 THEN
                  exp_1137668671329_10
                  ELSE exp_1137668671329_11
              END,
      TT.n_pre_mitigation_rwa_ul = CASE
                  WHEN cond_1137668723538_
                  10 = 10 THEN
                  exp_1137668723538_10
                  ELSE exp_1137668723538_11
              END
```

What is claimed is:

1. A method of processing business rules of a financial application, said method comprising:

receiving a plurality of business rules, each business rule designed to update a corresponding set of business objects stored in a database system and used by said financial application, said corresponding set of objects modelling data sought to be processed by said financial application, each object containing respective attributes;

forming a set of buckets after said receiving, each bucket containing business rules of said plurality of business rules that do not have inter-dependency in execution order, wherein business rules having inter-dependency in execution order are placed into different buckets of said set of buckets, wherein said forming is performed upon said receiving of said plurality of business rules;

for each bucket of said set of buckets:

determining a plurality of subsets of business rules contained in the bucket, wherein business rules of each subset of business rules specify update of respective different attributes of a corresponding common business object, wherein the respective different attributes specified by the business rules of each subset of business rules constituting a corresponding subset of attributes, wherein said plurality of subsets of business rules includes a first subset of business rules designed to update a first business object, said first subset of business rules including a first business rule and a second business rule respectively specify update of a first attribute and a second attribute of said first business object such that the subset of attributes corresponding to said first subset of business rules comprise said first attribute and said second attribute;

generating a corresponding single instruction set for each subset of said plurality of subsets of business rules, wherein said corresponding single instruction set comprises a single command designed to update the respective subset of attributes of the corresponding common object upon being issued to said database system, wherein the respective subset of attributes are specified by the corresponding subset of business rules for which the single instruction set is generated, wherein said generating generates a first instruction set for said first subset of business rules including said first business rule and said second business rule, said first instruction set being generated as a single instruction set in view of said first business rule and said second business rule specifying update of different attributes of the same first business object, said first instruction set designed to update said first attribute and said second attribute of said first business object; and executing concurrently in a server system, the instruction sets generated for said plurality of subsets of business rules contained in the bucket to cause corresponding commands to be issued to said database system, wherein execution of said corresponding single instruction set causes update of the attributes of the corresponding common object, wherein said executing of said first instruction set in said server system causes update of said first attribute and said second attribute of said first business object, wherein said receiving, said forming, said determining, and said generating are performed in an administrator system, wherein a fourth business rule and a fifth business rule is deemed to have inter-dependency if the execution of said fifth business rule is required to commence only after completion of execution of said fourth business rule according to said execution order and deemed to not have inter-dependency otherwise, wherein said fourth business rule and said fifth business rule is contained in said plurality of business rules, wherein said forming includes said fourth business rule in a first bucket and said fifth business rule in a second bucket different from said first bucket, wherein said first bucket and said second bucket are contained in said set of buckets, wherein said executing executes instructions sets generated for said first bucket before executing instruction sets generated for said second bucket.

2. The method of claim 1, wherein said determining determines a first plurality of subsets of business rules in said first bucket of said set of buckets, wherein said first plurality of subset of business rules includes said first subset of business rules, said method further comprising:

sending for display said first plurality of subsets of business rules, including said first subset of business rules, while indicating that each of said first plurality of subsets of business rules can be merged; and receiving, from a business user of said financial application, an input data indicating whether or not said first subset of business rules is to be merged, wherein said generating generates a first instruction set for said first subset of business rules if said input data indicates that said first subset of business rules is to be merged and generates a separate instruction set for each business rule of said first subset of business rules otherwise.

3. The method of claim 2, wherein said first plurality of subset of business rules also includes a second subset of business rules, wherein said input data indicates that a third business rule of said second subset of business rules is to be excluded from merging, wherein said generating generates said corresponding single instruction set for said second subset of business rules excluding said third business rule.

4. The method of claim 2, wherein said first plurality of subset of business rules includes a third subset of business rules designed to update a third business object, wherein said third business rule also of said first bucket is not included in said third subset of business rules in view of said third business rule not updating said third business object, said method further comprising:

receiving a modified business rule of said third business rule, wherein said modified business rule is designed to update said third business object, wherein said determining and said generating are performed again to cause said modified business rule to be included in said third subset of business rules and said corresponding single instruction set for said third subset of business rules to be generated to include said modified business rule.

5. The method of claim 1, wherein said receiving also receives a precedence data indicating a corresponding set of business rules that are required to be executed prior to execution of each business rule of said plurality of business rules, wherein said precedence data indicates that said fourth business rule is required to be executed prior to said fifth business rule.

6. The method of claim 1, wherein the business objects used by said financial application are stored in a relational database server, wherein each of said plurality of business rules, upon execution independently, would be implemented as a corresponding SQL (structured query language) command directed to said relational database server, wherein said corresponding single instruction set, upon said executing, is implemented in the form of a single SQL command directed to said relational database server.

7. A non-transitory machine readable medium storing one or more sequences of instructions for enabling a system to process business rules of a financial application, wherein execution of said one or more instructions by one or more processors contained in said system enables said system to perform the actions of:

receiving a plurality of business rules, each business rule designed to update a corresponding set of business objects stored in a database system and used by said financial application, said corresponding set of objects modelling data sought to be processed by said financial application, each object containing respective attributes;

forming a set of buckets after said receiving, each bucket containing business rules of said plurality of business rules that do not have inter-dependency in execution order, wherein business rules having inter-dependency in execution order are placed into different buckets of said set of buckets, wherein said forming is performed upon said receiving of said plurality of business rules;

for each bucket of said set of buckets:

determining a plurality of subsets of business rules contained in the bucket, wherein business rules of each subset of business rules specify update of respective different attributes of a corresponding common business object, wherein the respective different attributes specified by the business rules of each subset of business rules constituting a corresponding subset of attributes, wherein said plurality of subsets of business rules includes a first subset of business rules designed to update a first business object, said first subset of business rules including a first business rule and a second business rule respectively specify update of a first attribute and a second attribute of said first business object such that the subset of attributes corresponding to said first subset of business rules comprise said first attribute and said second attribute;

generating a corresponding single instruction set for each subset of said plurality of subsets of business rules, wherein said corresponding single instruction set comprises a single command designed to update the respective subset of attributes of the corresponding common object upon being issued to said database system, wherein the respective subset of attributes are specified by the corresponding subset of business rules for which the single instruction set is generated, wherein said generating generates a first instruction set for said first subset of business rules including said first business rule and said second business rule, said first instruction set being generated as a single instruction set in view of said first business rule and said second business rule specifying update of different attributes of the same first business object, said first instruction set designed to update said first attribute and said second attribute of said first business object; and executing concurrently in a server system, the instruction sets generated for said plurality of subsets of business rules contained in the bucket to cause corresponding commands to be issued to said database system, wherein execution of said corresponding single instruction set causes update of the attributes of the corresponding common object, wherein said executing of said first instruction set in said server system causes update of said first attribute and said second attribute of said first business object, wherein said receiving, said forming, said determining, and said generating are performed in an administrator system.

8. The non-transitory machine readable medium of claim 7, wherein said determining determines a first plurality of subsets of business rules in a first bucket of said set of buckets, wherein said first plurality of subset of business rules includes said first subset of business rules, further comprising one or more instructions for:

sending for display said first plurality of subsets of business rules, including said first subset of business rules, while indicating that each of said first plurality of subsets of business rules can be merged; and receiving, from a business user of said financial application, an input data indicating whether or not said first subset of business rules is to be merged, wherein said generating generates a first instruction set for said first subset of business rules if said input data indicates that said first subset of business rules is to be merged and generates a separate instruction set for each business rule of said first subset of business rules otherwise.

9. The non-transitory machine readable medium of claim 8, wherein said first plurality of subset of business rules also includes a second subset of business rules, wherein said input data indicates that a third business rule of said second subset of business rules is to be excluded from merging, wherein said generating generates said corresponding single instruction set for said second subset of business rules excluding said third business rule.

10. The non-transitory machine readable medium of claim 8, wherein said first plurality of subset of business rules includes a third subset of business rules designed to update a third business object, wherein said third business rule also of said first bucket is not included in said third subset of business rules in view of said third business rule not updating said third business object, further comprising one or more instructions for:

receiving a modified business rule of said third business rule, wherein said modified business rule is designed to update said third business object, wherein said determining and said generating are performed again to cause said modified business rule to be included in said third subset of business rules and said corresponding single instruction set for said third subset of business rules to be generated to include said modified business rule.

11. The non-transitory machine readable medium of claim 7, wherein a fourth business rule and a fifth business rule is deemed to have inter-dependency if the execution of said fifth business rule is required to commence only after completion of execution of said fourth business rule according to said execution order and deemed to not have inter-dependency otherwise, wherein said fourth business rule and said fifth business rule is contained in said plurality of business rules, wherein said forming includes said fourth business rule in said first bucket and said fifth business rule in a second bucket different from said first bucket, wherein said first bucket and said second bucket are contained in said set of buckets.

12. The non-transitory machine readable medium of claim 11, wherein said receiving also receives a precedence data indicating a corresponding set of business rules that are required to be executed prior to execution of each business rule of said plurality of business rules, wherein said precedence data indicates that said fourth business rule is required to be executed prior to said fifth business rule.

13. The non-transitory machine readable medium of claim 7, wherein the business objects used by said financial application are stored in a relational database server, wherein each of said plurality of business rules, upon execution independently, would be implemented as a corresponding SQL (structured query language) command directed to said relational database server, wherein said corresponding single instruction set, upon said executing, is implemented in the form of a single SQL command directed to said relational database server.

14. A digital processing system comprising:

a processor;

a random access memory (RAM);

a non-transitory machine readable medium to store one or more instructions, which when retrieved into said RAM and executed by said processor causes said digital processing system to process business rules of a financial application, said digital processing system performing the actions of:

receiving a plurality of business rules, each business rule designed to update a corresponding set of business objects stored in a database system and used by said financial application, said corresponding set of objects modelling data sought to be processed by said financial application, each object containing respective attributes;

forming a set of buckets after said receiving, each bucket containing business rules of said plurality of business rules that do not have inter-dependency in execution order, wherein business rules having inter-dependency in execution order are placed into different buckets of said set of buckets, wherein said forming is performed upon said receiving of said plurality of business rules;

for each bucket of said set of buckets:

determining a plurality of subsets of business rules contained in the bucket, wherein business rules of each subset of business rules specify update of respective different attributes of a corresponding common business object, wherein the respective different attributes specified by the business rules of each subset of business rules constituting a corresponding subset of attributes, wherein said plurality of subsets of business rules includes a first subset of business rules designed to update a first business object, said first subset of business rules including a first business rule and a second business rule respectively specify update of a first attribute and a second attribute of said first business object such that the subset of attributes corresponding to said first subset of business rules comprise said first attribute and said second attribute;

generating a corresponding single instruction set for each subset of said plurality of subsets of business rules, wherein said corresponding single instruction set comprises a single command designed to update the respective subset of attributes of the corresponding common object upon being issued to said database system, wherein the respective subset of attributes are specified by the corresponding subset of business rules for which the single instruction set is generated, wherein said generating generates a first instruction set for said first subset of business rules including said first business rule and said second business rule, said first instruction set being generated as a single instruction set in view of said first business rule and said second business rule specifying update of different attributes of the same first business object, said first instruction set designed to update said first attribute and said second attribute of said first business object; and executing concurrently in a server system, the instruction sets generated for said plurality of subsets of business rules contained in the bucket to cause corresponding commands to be issued to said database system, wherein execution of said corresponding single instruction set causes update of the attributes of the corresponding common object, wherein said executing of said first instruction set in said server system causes update of said first attribute and said second attribute of said first business object, wherein said receiving, said forming, said determining, and said generating are performed in an administrator system.

15. The digital processing system of claim 14, wherein for said determining, said digital processing system determines a first plurality of subsets of business rules in a first bucket of said set of buckets, wherein said first plurality of subset of business rules includes said first subset of business rules, said digital processing system further performing the actions of:

sending for display said first plurality of subsets of business rules, including said first subset of business rules, while indicating that each of said first plurality of subsets of business rules can be merged into a corresponding single instruction set; and receiving, from a business user of said financial application, an input data indicating whether or not said first subset of business rules is to be merged, wherein said generating generates a first instruction set for said first subset of business rules if said input data indicates that said first subset of business rules is to be merged and generates a separate instruction set, for said first subset of business rules otherwise.

16. The digital processing system of claim 15, wherein said first plurality of subset of business rules also includes a second subset of business rules, wherein said input data indicates that a third business rule of said second subset of business rules is to be excluded from merging, wherein said digital processing system generates said corresponding single instruction set for said second subset of business rules excluding said third business rule.

17. The digital processing system of claim 14, wherein said first plurality of subset of business rules includes a third subset of business rules designed to update a third business object, wherein said third business rule also of said first bucket is not included in said third subset of business rules in view of said third business rule not updating said third business object, said digital processing system further performing the actions of:

receiving a modified business rule of said third business rule, wherein said modified business rule is designed to update said third business object, wherein said digital processing system performs said determining and said generating again to cause said modified business rule to be included in said third subset of business rules and said corresponding single instruction set for said third subset of business rules to be generated to include said modified business rule.

18. The digital processing system of claim 14, wherein a fourth business rule and a fifth business rule is deemed to have inter-dependency if the execution of said fifth business rule is required to commence only after completion of execution of said fourth business rule according to said execution order and deemed to not have inter-dependency otherwise, wherein said fourth business rule and said fifth business rule is contained in said plurality of business rules, wherein said digital processing system also receives a precedence data indicating a corresponding set of business rules that are required to be executed prior to execution of each business rule of said plurality of business rules, wherein said precedence data indicates that said fourth business rule is required to be executed prior to said fifth business rule, wherein said digital processing system includes said fourth business rule in said first bucket and said fifth business rule in a second bucket different from said first bucket, wherein said first bucket and said second bucket are contained in said set of buckets.

19. The digital processing system of claim 14, wherein the business objects used by said financial application are stored in a relational database server, wherein each of said plurality of business rules, upon execution independently, would be implemented as a corresponding SQL (structured query language) command directed to said relational database server, wherein said corresponding single instruction set, upon said executing, is implemented in the form of a single SQL command directed to said relational database server.

* * * * *